United States Patent [19]

Kovalcin

[11] Patent Number: 4,720,782
[45] Date of Patent: Jan. 19, 1988

[54] CONSOLE UNIT FOR CLUSTERED DIGITAL DATA PROCESSING SYSTEM

[75] Inventor: David Kovalcin, Grafton, Mass.
[73] Assignee: Digital Equipment Corporation, Maynard, Mass.
[21] Appl. No.: 818,612
[22] Filed: Jan. 13, 1986
[51] Int. Cl.[4] ............................................. G06F 15/16
[52] U.S. Cl. ................................................... 364/200
[58] Field of Search ... 364/200 MS File, 900 MS File
[56] References Cited

U.S. PATENT DOCUMENTS 4,305,125  12/1981  Sato et al. ........................... 364/200

*Primary Examiner*—Raulfe B. Zache
*Attorney, Agent, or Firm*—Cesari and McKenna

[57] ABSTRACT

A cluster console unit for connection to a plurality of digital computer systems and high-speed mass storage systems which may be connected together to form a cluster, the cluster console unit allowing an operator to monitor operations of the systems comprising the cluster from the single console unit. The cluster console unit includes an input/output data logger which receives data through from the systems each through a separate port and stores the data in a log file. In addition the data logger transmits the data from each system to a separate communications pipe for each system and control information through a control pipe. An operator interface unit is connected to receive all of the data from all of the separate communications pipes and displays data from selected systems on a terminal screen. When the operator enters operator data for transmission to a system, the operator interface transmits the data and the identification of the system to receive the data to a operator data. The data logger receives the communications from the operator pipe and transmits the data to the identified system. A data scanner scans all data on all of the system communications pipes and generates an event message for transmission over a scan pipe if the data matches preselected alarm data. The operator interface monitors the scan pipe and displays any event messages.

12 Claims, 30 Drawing Figures

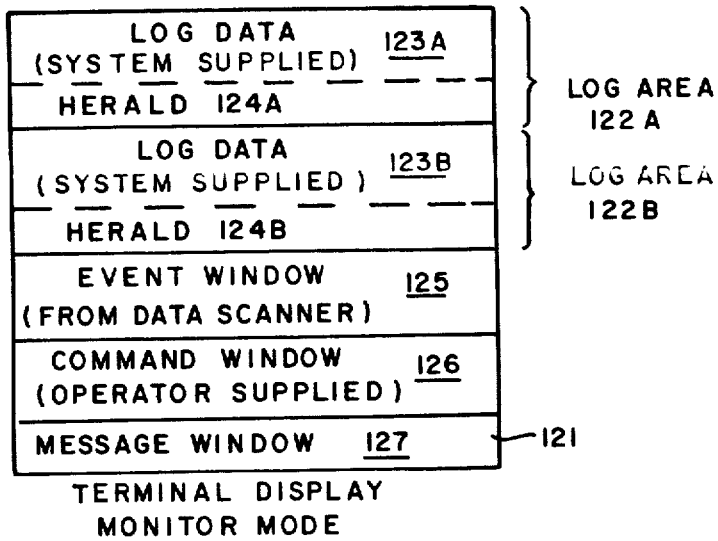
FIG.4A
FIG.4B
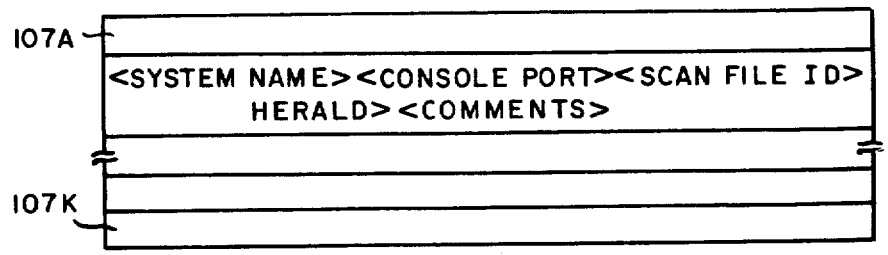
FIG.5
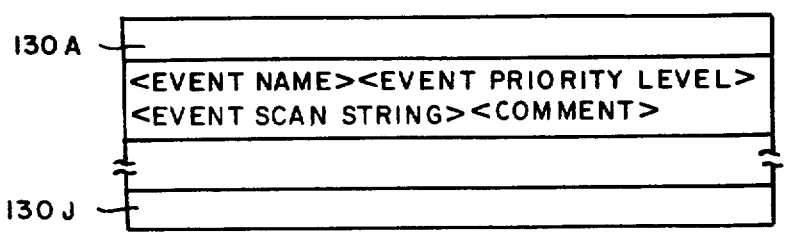
FIG.6

LOG FILE ENTRY FORMAT

CONFIG ENTRY DATA

ERROR ENTRY DATA

SERVICE INITIATION /
TERMINATION ENTRY DATA

OPERATOR STATUS CHANGE

OPERATOR TO SYSTEM
OUTPUT ENTRY DATA

SYSTEM OUTPUT ENTRY DATA

FIGURE 9

EXECUTIVE

ON POWER-ON, ESTABLISH I/O DATA LOGGER,
DATA SCANNER PIPES 104A-104K AND 108
|
V
WAIT FOR OPERATOR INPUT
|
| /WAIT
V
OPERATOR INPUT
|
V
ESTABLISH OPERATOR INTERFACE FOR
TERMINAL AT WHICH INPUT WAS ENTERED
|
V
ESTABLISH OPERATOR PIPE 111
|
V
WAS OPERATOR INPUT A RECORDER COMMAND
WITH < SYSTEM NAMES >? ---------------- NO
|                                         |
| YES                                     |
V                                         |
INITIATE DATA RECORDER OPERATION FOR      |
IDENTIFIED SYSTEMS                        |
|                                         |
V                                         |
RETURN                                    |
---------------------
|
V
WAS COMMAND A CONNECT COMMAND WITH <SYSTEM NAME>
OR MONITOR COMMAND WITH <SYSTEM NAMES>?
|
V
PASS COMMAND AND SYSTEM NAME(S) TO OPERATOR
INTERFACE, WAIT FOR CONTROL CHARACTER
|
| /WAIT
V
HAS AN ESCAPE OR EXIT BEEN INPUT? --------- NO
|                                            |
| YES                                        |
V                                            |
TERMINATE PROCESSING OF CONNECT OR           |
MONITOR COMMAND                              |
|  ---------------------
V
HAS A SHUTDOWN COMMAND BEEN INPUT
|
| YES
V
TERMINATE PROCESSING

I/O DATA LOGGER

FIGURE 11

DATA RECORDED

```
RECEIVE <SYSTEM NAMES> FROM EXECUTIVE
PROGRAM
            |
            | <----------------------
            V                       |
     INITIALIZE A POINTER           |
            |                       |
            |                       |
            V                       |
     DETERMINE SYSTEM NAME ASSOCIATED WITH
---->  POINTER                      |
 |          |                       |
 |          |                       |
 |          V                       |
 |   DETERMINE BUFFER ASSOCIATED WITH
 |   SYSTEM NAME POINTED TO BY POINTER
 |          |                       |
 |          |                       |
 |          V                       |
 |    DOES BUFFER HAVE ANY DATA NOT
 |    PREVIOUSLY RECORDED?   ---- NO
 |          |                |      |
 |          | YES            |      |
 |          V                |      |
 |    RECORD SYSTEM NAME, DATA,    |
 |    TIME                   |      |
 |          |                |      |
 |          | <---------            |
 |          V                       |
 |    HAVE BUFFERS ASSOCIATED WITH ALL
 |    SYSTEM NAMES BEEN EXAMINED?   ------ YES
 |          |
 |          | NO
 |          V
 |    ADJUST POINTER TO POINT TO NEXT
 |------  SYSTEM NAME
```

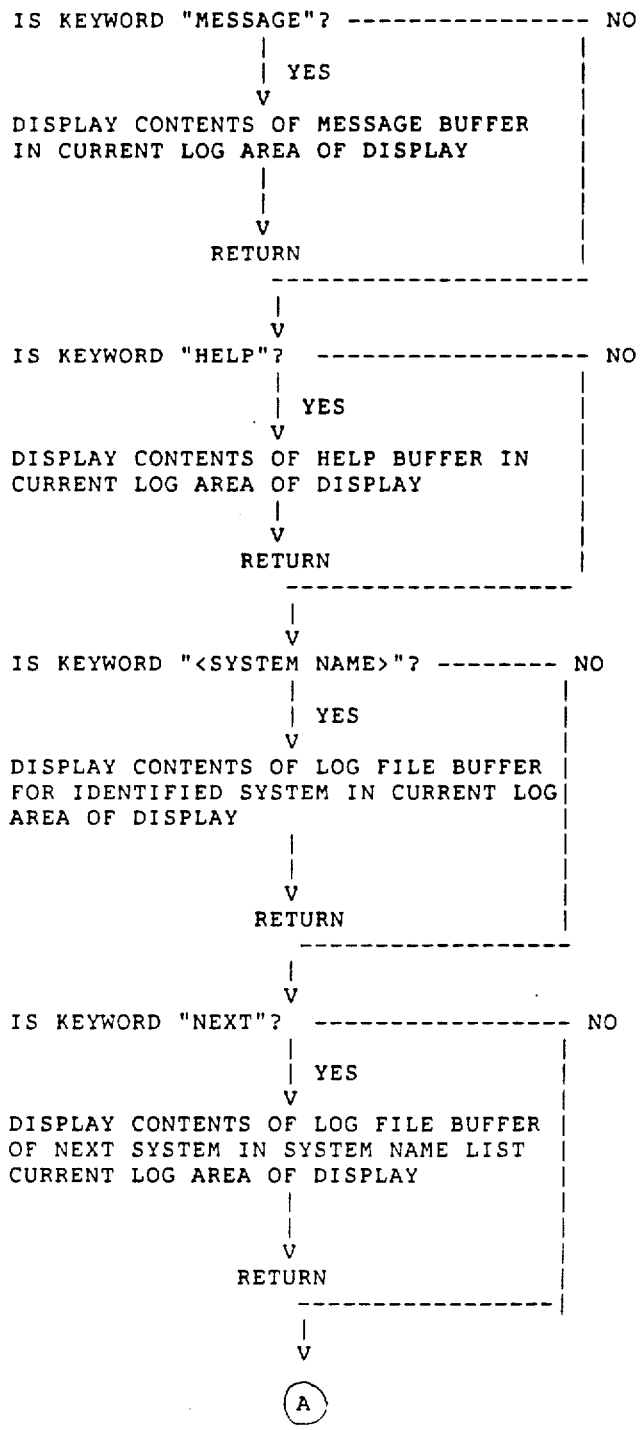

FIGURE 12D-1

"VIEW" COMMAND

```
IS KEYWORD "MESSAGE"? ---------------- NO
              |                         |
              | YES                     |
              V                         |
DISPLAY CONTENTS OF MESSAGE BUFFER      |
IN CURRENT LOG AREA OF DISPLAY          |
              |                         |
              |                         |
              V                         |
           RETURN                       |
        --------------------            |
              |                         
              V                         
IS KEYWORD "HELP"? ------------------ NO
              |                         |
              | YES                     |
              V                         |
DISPLAY CONTENTS OF HELP BUFFER IN      |
CURRENT LOG AREA OF DISPLAY             |
              |                         |
              V                         |
           RETURN                       |
        --------------------            |
              |
              V
IS KEYWORD "<SYSTEM NAME>"? --------- NO
              |                         |
              | YES                     |
              V                         |
DISPLAY CONTENTS OF LOG FILE BUFFER     |
FOR IDENTIFIED SYSTEM IN CURRENT LOG    |
AREA OF DISPLAY                         |
              |                         |
              |                         |
              V                         |
           RETURN                       |
        --------------------            
              |
              V
IS KEYWORD "NEXT"? ------------------ NO
              |                         |
              | YES                     |
              V                         |
DISPLAY CONTENTS OF LOG FILE BUFFER     |
OF NEXT SYSTEM IN SYSTEM NAME LIST      |
CURRENT LOG AREA OF DISPLAY             |
              |                         |
              |                         |
              V                         |
           RETURN                       |
        -------------------|
              |
              V
             (A)
```

FIGURE 12E

```
WAS DISABLE <SYSTEM NAME> COMMAND
ENTERED                          ------------------NO
          |                                          |
          | YES                                      |
          V                                          |
IS SYSTEM NAME IN SYSTEM NAME                        |
LIST?                            --------- YES       |
          |                                |         |
          | NO                             |         |
          V                                |         |
ENTER ERROR ENTRY IN LOG                   |         |
FILE 110 AND DISPLAY ERROR                 |         |
MESSAGE IN MESSAGE WINDOW                  |         |
127                                        |         |
          |                                |         |
          V                                |         |
        RETURN                             |         |
        ------------                       |         |
                |                                    |
                V                                    |
MARK SYSTEM AS BEING DISABLED                        |
          |                                          |
          V                                          |
        RETURN                                       |
          |      ------------------                  |
          V                                          |
WAS ENABLE <SYSTEM NAME> COMMAND
ENTERED?
               | YES
               V
WAS SYSTEM NAME IN SYSTEM NAME LIST? ----- YES
          |                                |
          | NO                             |
          V                                |
ENTER ERROR ENTRY IN LOG FILE 110 AND      |
DISPLAY ERROR MESSAGE IN MESSAGE WINDOW    |
127                                        |
          |                                |
          V                                |
        RETURN                             |
        -----------------------------------
          |
          V
REMOVE DISABLE MARK FOR SYSTEM
```

FIGURE 12H

```
WAS A SELECT <SYSTEM NAME> COMMAND
ENTERED?
            | YES
            V
DISPLAY COMMAND IN COMMAND WINDOW 126
            | <---------------------
            V                       |
HAS ANY NEW DATA BEEN RECEIVED FROM |
PIPE 101A-104K ASSOCIATED WITH SYSTEM
WHOSE SYSTEM NAME WAS ENTERED?      |
            |
            | YES
            V
         DISPLAY DATA
            |
            |
            V
HAS OPERATOR ENTERED A DATA   NO
STRING                      --------------->|
            |
            | YES
            V
IS DATA STRING AN ESCAPE      ----- NO
CHARACTER OR BREAK CHARACTER    |
            |                   |
            | YES               |
            V .                 |
         RETURN                 |
         ----------------
            |
            V
DOES A SET LOCK ON CONDITION EXIST
FOR THE SYSTEM NAME         --------- NO
            |
            | YES
            V
DISPLAY ERROR MESSAGE IN
MESSAGE WINDOW 127
            |
            V
         RETURN
         -----------
            |
            V
GENERATE SELECT PACKET IDENTIFYING
SYSTEM, TRANSFER TO OPERATOR PIPE
111A, 111B
            |
            |
            V
TRANSFER PACKET 10 INPUT OF CONTROL
PIPE 111A, 111B ASSOCIATED WITH
OPERATOR INTERFACE FOR TERMINAL AT
WHICH DATA STRING WAS ENTERED
            |---------------------|
```

DATA SCANNER

CONSOLE UNIT FOR CLUSTERED DIGITAL DATA PROCESSING SYSTEM

BACKGROUND OF THE INVENTION

1. Field of the Invention

The invention relates generally to the field of digital data processing systems and more specifically to systems comprising clusters of individual computer systems. The invention comprises a cluster console unit for connection to the individual computer systems comprising the cluster for monitoring the operations and status of the computer systems.

2. Description of the Prior Art

A computer system typically comprises three basic elements: namely, a memory element, an input/output element and a processor element. The memory element stores information in addressable storage locations. This information includes data and instructions for processing the data. The processor element transfers information to and from the memory element, interprets the incoming information as either data or instructions and processes data in accordance with the instructions. The input/output element also communicates with the memory element in order to transfer input data to the system and to obtain processed data from it.

Initially, computer systems were generally standalone systems; that is, a single processor would communicate only with its own memory and with its own input/output units. To increase the processing speeds and enhance reliability and availability of the system to users, data processing systems have recently been developed which include multiple processors units. In some such multi-processing systems, the processors are connected directly together or through a random-access memory unit. The diverse processors would have access to shared data in the memory unit. In some arrangements, the processors may share such peripheral devices as disk and tape storage units, printers, video display terminals, telecommunications interface equipment and the like, and in others each processor may have separate such equipment.

More recently, efforts have been made to interconnect a number of such computer systems and peripheral equipment which may be shared by the diverse computer systems to form a single digital data processing system. In one interconnection scheme, each computer system and shared peripheral unit is connected to and communicates over a network. In the network, the computer systems and shared units transmit messages in the form of packets of information. The computer systems that are connected into the network are able to share data and programs through the shared disk and tape drives.

An alternate interconnection mechanism that is particularly useful for computer systems that are not so widely used is to cluster. A cluster typically includes fewer communicating units, that is nodes than can be accommodated by a network.

One problem arises, however, by providing multiple nodes interconnected in a cluster. The nodes comprising the cluster may be located in diverse locations and the system console for each computer system is typically colocated with its associated computer system. The system console provides the operator interface to the system. It allows the operator to examine and deposit data in the system, to halt the operation of the processor or step it through a sequence of program instructions. It enables an operator to initialize the computer system through a bootstrap procedure and perform various diagnostic procedures. However, locating each system console with its associated computer system would require the operator to move to the various locations of the computer systems to perform the required tasks, or several operators would be required for the various locations. Having an operator at each location adds to the cost of operating the cluster data processing system. However, having only a single operator who must move from location to location to determine the operating status of the computer system at each location precludes determining the operating status of all of the computer systems at one time. In some emergency situations, this may be undesirable.

SUMMARY OF THE INVENTION

The invention provides a new and improved console unit which may be connected to all of the computer systems and other nodes forming a cluster to permit an operator to monitor the operating status of all of the nodes in the cluster therefrom.

In brief summary, the cluster console includes an input/output interface connected to all of the console lines from each of the nodes forming the cluster. The input/output interface automatically records all of the incoming data from the console lines as well as information concerning the operation of the console. It also transmits the data over communications pipes, with one pipe being associated with each console line from the systems being monitored. An operator interface monitors selected ones of the communications pipes and displays information concerning the data on a video display terminal. In addition, a data scanner scans the data transmitted over selected ones of the communications pipes for predetermined data patterns and informs the operator interface when one of the data patterns has been received. The operator at the terminal may, through the operator interface, generate data for transmission to one or more computer systems which it is monitoring over another communications pipe. The input/output interface then transmits the data over the console line associated with the computer systems to which the data is to be transmitted.

In a further refinement of the invention, a recorder interface also monitors the communications pipes for data from the input/output interface and enables the data from predetermined systems to be printed.

BRIEF DESCRIPTION OF THE DRAWINGS

The invention is pointed out with particularity in the appended claims. The above and further advantages of the invention may be better understood with reference to the following detailed description of an illustrative embodiment, when taken in conjunction with the accompanying drawings in which:

FIGS. 4A and 4B illustrate the structure of displays used in one embodiment of the cluster console;

FIGS. 5, 6, 7, 8, 8A, 8B, 8C, 8D, 8E and 8F illustrate various data structures used by the programs depicted in FIG. 3; and FIGS. 9, 10, 11, 12A, 12B, 12C, 12D-1, 12D-2, 12E, 12F, 12G, 12H, 12I, 12J and 12K contain flow diagrams useful in understanding the operations of the programs of the cluster console constructed in accordance with the invention.

DETAILED DESCRIPTION OF AN ILLUSTRATIVE EMBODIMENT

A. General Description of Cluster Data Processing System

Figure 1:
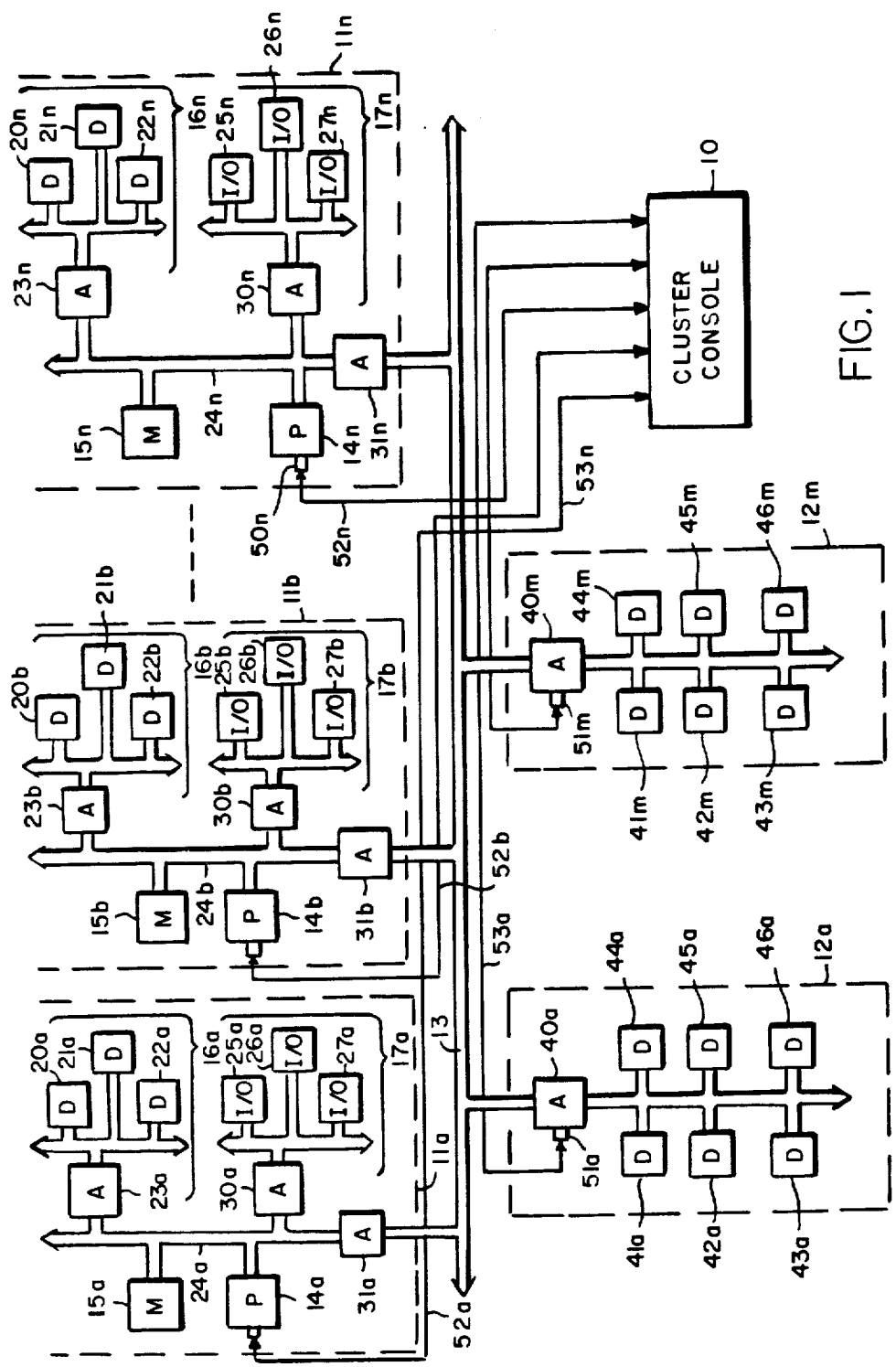
FIG. 1 is a block diagram of a clustered data processing system including a cluster console constructed in accordance with this invention.

With reference to FIG. 1, an illustrative clustered digital data processing system includes a cluster console 10 constructed in accordance with the invention for monitoring the operation of a plurality of cluster nodes, including computer systems 11a, 11b–11n and high-speed mass storage systems 12a–12m which are interconnected by a common cluster bus 13. Each individual computer system includes a processor 14a through 14n, a memory 15a through 15n and may include one or more mass storage systems 16a through 16n and input-/output systems 17a through 17n.

All of the computer systems depicted in FIG. 1 are shown as having similar organizations, but it will be recognized that computer systems connected into a cluster with which console 10 may be used may have diverse organizations. However, the computer systems 11a–11n are shown as having similar organizations. In computer system 11a, for example, the mass storage system 16a includes one or more disk and/or tape drives 20a–20n which communicate with a system bus 24a–24n through an associated adapter 23a. Similarly, the input-/output system 17a, which may comprise, for example, printers, card readers, video display terminals and the like, includes one or more input/output units 25a–25n which also communicate with the system bus through a bus adapter 30a. In addition, an adapter 31a permits system bus 24a to communicate with cluster bus 13 to allow system 11a to communicate with, and share programs and data with, other systems in the cluster. The memory 15a and mass storage system 16a provides local storage for programs and data being run on processor 14a.

The mass storage systems 12a–12m are also shown as having similar organization, and in some clusters may have diverse organizations. In some clusters, only a single mass storage system 12a may be provided. However, since systems 12a–12n are shown as having similar organizations, only system 12a will be described in detail. System 12a includes one or more disk units 41a–41m which communicate with cluster bus 13 through an adapter 40a. Mass storage systems 12a–12m are used to store common data and programs which may be retrieved by the computer systems 11a–11n and processed. The data stored on the mass storage systems 12a–12m may be updated as the computer systems perform processing on the data stored therein. The communications between mass storage systems 12a–12m and computer systems 11a–11n takes place over cluster bus 13.

In addition, in one specific embodiment of the mass storage systems 12a through 12m, in which they comprise systems sold by the assignee of this application under the designation HSC-50, each of the adapters 40a through 40m also includes a console port. Console ports 50a through 50n are connected to the processors, and console ports 51a through 51m are connected to the adapters 40a–40m of the mass storage systems. Cluster console 10 is connected to each of the processor's console ports 50a–50n over a serial communications line 52a–52n and is further connected to each of the mass storage system's console ports 51a–51m over a serial communications link 53a through 53m. The communications between cluster console 10 and systems 11a–11n and 12a–12m is, in one specific embodiment, in the form of conventional ASCII data, with sequences of ASCII data from a single system being an ASCII string. In that embodiment, the communications links 52a–52n and 53a–53m are conventional optical fibers. It will be readily apparent that the data received by console 10 from systems 11a–11n and 12a–12m may have other forms than ASCII strings and that the communication links may be other than optical fibers.

B. Cluster Console

(i) General Description of Hardware

One embodiment of a cluster console 10 includes a programmed computer system, which will be described below in connection with FIGS. 2–12K. It will be readily apparent to those skilled in the art that a special purpose device may also be constructed to perform the operations described below.

Figure 2:
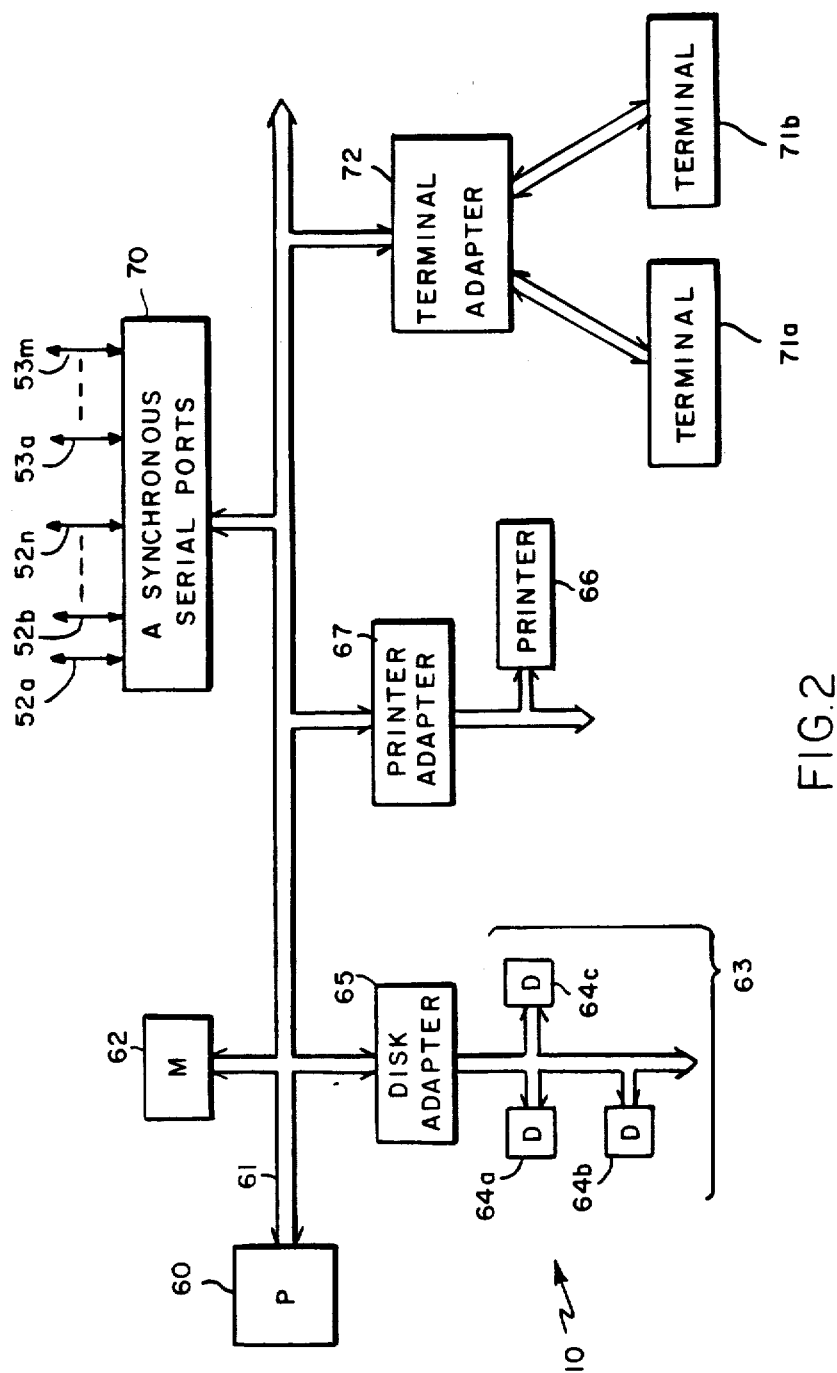
FIGS. 2 and 3 are schematic block diagrams illustrating the hardware and programs used in the cluster console constructed in accordance with this invention.

FIG. 2 depicts a hardware block diagram of a cluster console 10 constructed in accordance with the invention. In brief, the hardware comprising the cluster console includes a processor 60 having an input/output bus 61 which allows the processor 60 to communicate with a random access memory 62 and a disk storage subsystem 63 including one or more disk drives 64a through 64c connected to bus 61 through a disk adapter 65. In addition, the cluster console 10 includes a printer 66 connected to bus 61 through a printer adapter 67. The communications links 52a–52n and 53a–53m communicate with processor 60, and specifically bus 61, through asynchronous serial ports generally identified by reference numeral 70. In addition, the console 10 includes one or more video display terminals 71a and 71b which communicate with the processor 60 and bus 61 through a terminal adapter 72. In one specific embodiment, the processor 60 comprises a MicroVAX II processor sold by the assignee of the present application, and terminals 71a and 71b comprise terminals sold under the designation VT240. In some embodiments of console 10, only one terminal may be used, and in other embodiments more than two may be provided.

(ii) Description of Cluster Console Program

Figure 3:
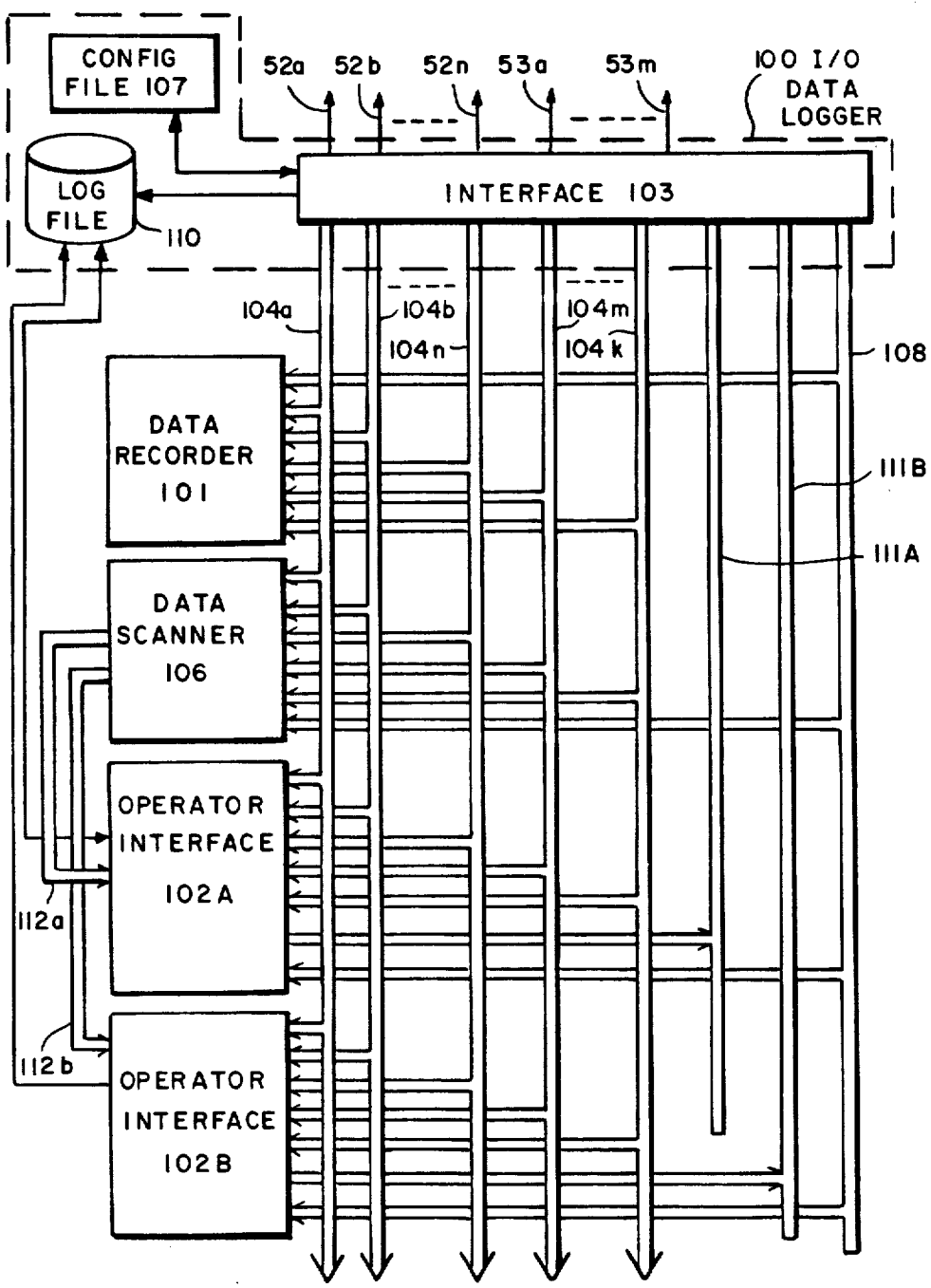
Figure 7:
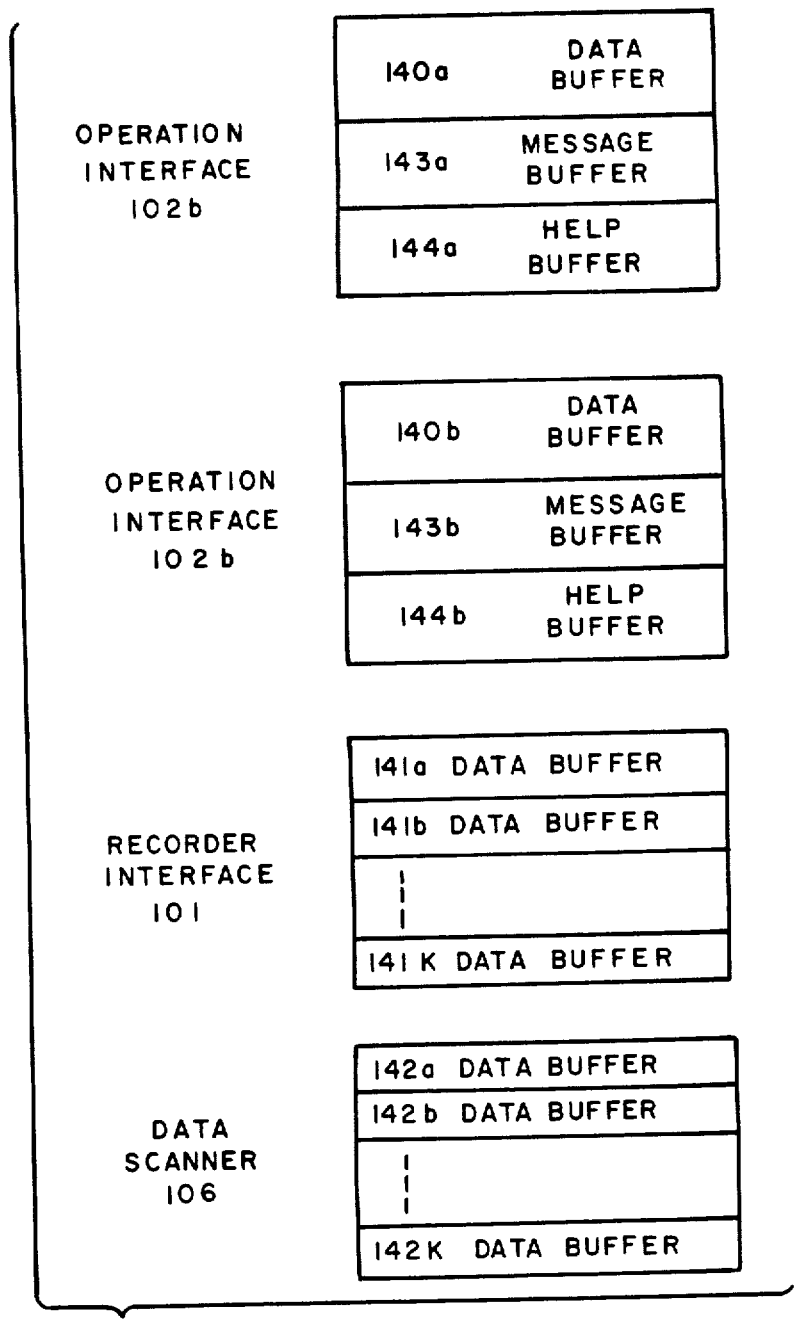

FIG. 3 represents, in diagramatic form, a block diagram illustrating the modules comprising the program executed by the hardware as depicted in FIG. 2 and the communication between the modules. In brief, the primary modules include an input/output (I/O) data logger 100, one or more data recorder modules 101, and one or more operator interface modules 102 (represented by operator interfaces 102A and 102B) each of which operates as the interface module for the operator's video display terminals 71a, 71b (FIG. 2). The I/O data logger module includes an interface module 103 which receives the data in the form of ASCII data strings from the console lines 52a–52n and 53a–53m. This is represented diagrammatically in FIG. 3; in the embodiment of the system depicted in FIGS. 2 and 3, a conventional operating system driver program takes the data from the various asynchronous serial ports 70 and loads it into buffers in memory 62 associated with each of the console console communications links. The data in the buffers is then processed by interface module 103.

As will be described below, the interface module 103 also couples the data over a set of communications pipes 104a–104k each of which is associated with one of the systems 11a–11n and 12a–12m. A pipe is a conventional data transfer mechanism (see for example, H. Deitel, An Introduction to Operating Systems [Addison-Wesley, 1984] at pages 490–496) in which the output of one program module or process, in this case the module represented by interface 103, makes data available to another module, in this case the module represented by data recorder module 101, and operator interface modules 102A and 102B or, as will be described later, a data scanner module 106. To identify the correspondence between the separate ports 70 and the systems 11a–11n and 12a–12m, and thus the pipe 104a–104k over which the received data should be coupled, the interface 103 uses the contents of a configuration file 107, which will be described in more detail in connection with FIG. 5.

In addition, in response to the receipt of data strings from the console communication links 52a–52n and 53a–53m, I/O data logger module 100 causes entries to be written into a log file 110. With reference to FIG. 2, the log file 110 represents selected buffers in memory 62, which periodically are transferred to disk in disk units 63. As will be described below in connection with FIGS. 8–8F, certain other operations in cluster console 10 also cause data logger module 100 to write entries in the log file 110.

In addition to pipes 104a–104k, the cluster console 10 includes an operator data 111 associated with each operator interface 102A, 102B, which transfers ASCII strings data and other information to the interface 103 in I/O data logger module 100. Thus, with reference to FIG. 3, operator interface 102a has an operator data 111a and auxilliary operator interface 102b has an associated operator data 111b. Operator interface 102a transfers information, primarily information typed by an operator at the video display terminal, over pipe 111a. Interface module 103 receives the information from pipe 111a and in response thereto performs certain operations as described below. Similarly, operator interface 102b uses pipe 111b to transfer information to interface 103. In response to the receipt of information from operator datas 111a, 111b, the interface 103 may transfer information over one or more of the console lines 52a–52n and 53a–53m and store an associated log entry in the log file 110.

The cluster console 10 further includes a control pipe 108 which receives control information from interface 103 and transfers it to all of the other modules, including data recorder 101, data scanner 106, and operator interfaces 102a, 102b. The information transferred over control pipe 108 includes such information as operator error information, reconfiguration information, lock information and shutdown information, all of which will be described below. In addition, the control pipe 108 transfers information to the data scanner module 106 when an operator initiates operator interface processing which requires data scanner operation as described below.

The data scanner 106 will be described here briefly; a more extensive description of the data scanner 106 will be provided below. The data scanner also receives the ASCII string data from communications pipes 104a–104k. When an operator begins monitoring selected systems 111a–111n and 112a–112m at an operator interface 1020, 1026, interface 103 sends a control message over control pipe 108 to the scanner 106 identifying the operator interface and the systems being monitored. The data scanner monitors the data from pipoes 104a–104k and notifies the operator interface 102A, 102B over a scan pipe 112 when predetermined strings have been received. The data scanner 106 has access to a set of scan files, which are described in detail in connection with FIG. 6, which contain for each system the strings for which the scanner 106 scans. The particular scan files which are used depend upon the systems 111a–111n and 112a–112m identified in the control message from pipe 108. When the data scanner receives a string of data from a pipe 104a–104k which corresponds to a string in the scan files associated with the system which was associated with the pipe, it transmits a message to the operator interface on scan pipe 112 identifying as the recipient of the message the operator interface which was identified in the control message from interface 103 as monitoring the system from whose pipe 104a–104k the data string was received. The operator interface 102a, 102b receives the message and notifies the operator of the message.

With this background, a more detailed description of the cluster console 10 will now be presented. Initially, however, it will be helpful to describe the video display terminal display output, and various data structures used by the modules (FIG. 3) of the program executed in the cluster console 10.

(a) Display Output

The operator interface module 102 operates in one of two modes, namely, a connect mode and a monitor mode. In the connect mode, as depicted in FIG. 4a, the operator interface displays only the ASCII string data supplied by one of the systems 11a–11n or 12a–12m, whose identification was supplied when the mode was initiated.

The information entered by the operator, which, except for an escape character and an optional break character, is transmitted over operator data 111a, 111b with system destination information identifying the system 11a–11n or 12a–12m to receive the information. The interface 103 then uses the control information and the configuration information in configuration file 107 to determine the console communications port in ports 70 (FIG. 2) associated with the system identified in the destination information which accompanied the data, and transmits the data over the console communications link 52a–52n, 53a–53m, to the associated system. The data entered by the operator is not then displayed on the terminal 71a, 71b; however, since the information entered by an operator is echoed by the receiving system, if it is properly echoed, the data entered by the operator will also be displayed. The only operator entered data which normally is not so echoed is password information, for which no characters are echoed, and the escape character which is not transmitted by the console 10 to the system. When the operator enters the escape character, the operator interface 102a, 102b terminates the connect mode.

The other mode provided by operator interface 102a, 102b, is a monitor mode, whose terminal display is depicted in FIG. 4b. In that mode, the display can have one or two log areas 122 (two log areas are illustrated in FIG. 4b, having reference numerals 122A and 122B). Each log area includes a log data area 123 and a HERALD line 124 (two log data areas 123A and 123B and respective associated HERALD lines 124A and 124B are depicted in FIG. 4B). A HERALD line 124 identifies the system whose log data is depicted in the associated log data area 123.

The terminal display in the monitor mode also includes an event window 125 which displays event information which is received from the data scanner 106, and particularly the scan pipe 112. A command window 126 provides a region in which an operator can enter certain commands to be executed by the console 10 and a message window 127 provides a region in which the program modules of the cluster console 10 can cause the display of error and other status messages relating to their operation.

(b) Configuration File

As has been noted, the input/output data logger 100 includes a configuration file 107. The contents of the configuration file are depicted in FIG. 5. The configuration file 107 includes a plurality of entries 107a-107k each associated with one of the systems 11a-11n and 12a-12m in the cluster. Each entry includes a plurality of fields, including a SYSTEM NAME field, a CONSOLE PORT field, a SCAN FILE (ID) field, a HERALD field, and a COMMENTS field which may contain operator supplied comments. The contents of the SYSTEM NAME field in each entry identifies one of the systems 11a-11n and 12a-12m. Each system is associated with a unique system name. The contents of the CONSOLE PORT field identifies the particular one of the asynchronous serial ports 70 to which the system is connected. The contents of the SCAN FILE ID field identify the particular scan file to be used by the data scanner module 106. (A scan file will be described in further detail below in connection with FIG. 6). The contents of the HERALD field is an operator supplied identification for the system which is displayed in the HERALD line 124 of log area 122 (FIG. 4B). Finally, the COMMENTS field may contain such operator supplied comments as the location of the system and so forth.

(c) Scan File

FIG. 6 depicts the structure of a scan file used by the data scanner module 106 (FIG. 3). The data scanner module 106 may have access to several scan files. In particular, one scan file may be provided for each of the systems 11a-11n and 12a-12m being monitored; alternatively, several systems may make use of the same scan file. In either case, the contents of the scan file ID field in each entry of configuration file 107 identifies the particular scan file to be used with the system identified by the contents of the SYSTEM NAME field. Each scan file 130 includes a plurality of entries 130a-130J, with each entry being associated with one ASCII data string to be monitored. The entry includes an EVENT NAME field whose contents identify the event and an EVENT PRIORITY LEVEL field whose contents identify the priority of the event. In addition, each entry includes an EVENT SCAN STRING field which contains the ASCII data string to be monitored and a COMMENT field which may contain an operator supplied comment. The contents of the EVENT SCAN STRING field correspond to selected ASCII data strings from the pipes 104a-104k.

If a string is received whose contents wholly or partially match the contents of an EVENT SCAN STRING field, the data scanner 106 transmits a message containing the contents of the corresponding EVENT NAME field over the scan pipe 112, along with the identification of the operator interface 102a, 102b, that is monitoring the system 11a-11n, 112a-112m, which originated the string. If the string wholly or partially matches the contents of EVENT SCAN STRNG fields of several entries, the data scanner transmits a message over scan pipe 112 including the contents of the EVENT NAME field of the entry having the highest priority, as indicated by the contents of the EVENT PRIORITY field.

(d) Buffers

As has been noted above, the communications between the various modules, such as Input/Output data logger 100, data recorder 101, operator interfaces 102 (102a and 102b) and data scanner 106 are by means of pipes 104a-104k. An operator interface receives data from selected ones of pipes 104a-104k and displays it on a screen (not shown) of the associated video display terminal 71a, 71b. Contemporaneously, the operator interface loads the data into a first in—first out (FIFO) buffer 140. Each operator interface maintains its own buffer 140 and stores in it the most recently displayed data. As will be described below, the operator can review data in the operator interface which has already been displayed which is still in the buffer.

In addition, the operator interfaces 102a, 102b, use two other buffers, namely a message buffer 143 and a help buffer 144. The message buffer 143 is a first in-first out buffer that stores entries in the message window 127 (FIG. 4B) relating to status information relating to the cluster console 10 itself, specifically relating to errors noted in the operator interface 102a, 102b, and also control messages received from interface 103 over control pipe 108. The help buffer 144 contains various assistance messages for use by an operator.

The data recorder 101 and data scanner 106 also maintain separate sets of buffers 141a-140k and 142a-142k, respectively, for data from each pipe 140a-140k.

(e) Operations Performed by Cluster Console 10

With the above background, the operations will now be described in connection with FIGS. 9-12K. With reference to those figures, and particularly FIG. 9, which depicts an executory program when the program for the cluster console is first initiated in response to the power-on of the console 10 depicted in FIG. 2. At initial power-on, the I/O data logger 100 and data scanner 106 begin to run, as well as pipes 104a-104k, 108 and 112. The processor 61 (FIG. 2) monitors terminals 71a, 71b for operator input. In response to operator input, an operator interface 102a, 102b, is established for the terminal, and a corresponding pipe 111a, 111b is established. The operator at a terminal 71a, 71b, may enter one of three commands, namely RECORDER, CONNECT or MONITOR. If the operator enters the RECORDER or MONITOR commands, he also enters one or more names identifying the systems 11a-11n and 12a-12m for which the recorder 101 (FIG. 3) or operator interface 102a, 102b is to record and monitor. If the operator enters the CONNECT command, only one system name is entered, and the operator interface 102a, 102b, only monitors that system. The cluster console 10 can operate both the data recorder 101 in response to a RECORDER command and an operator interface in response to either the CONNECT or MONITOR command.

It will be appreciated that if multiple operator interfaces 102a and 102b, for example, are being run, each associated with one terminal 71a and 71b (FIG. 2); then each operator interface may be separately operating in response to a CONNECT command or a MONITOR command; they need not be operating in response to the same command.

Figure 10:
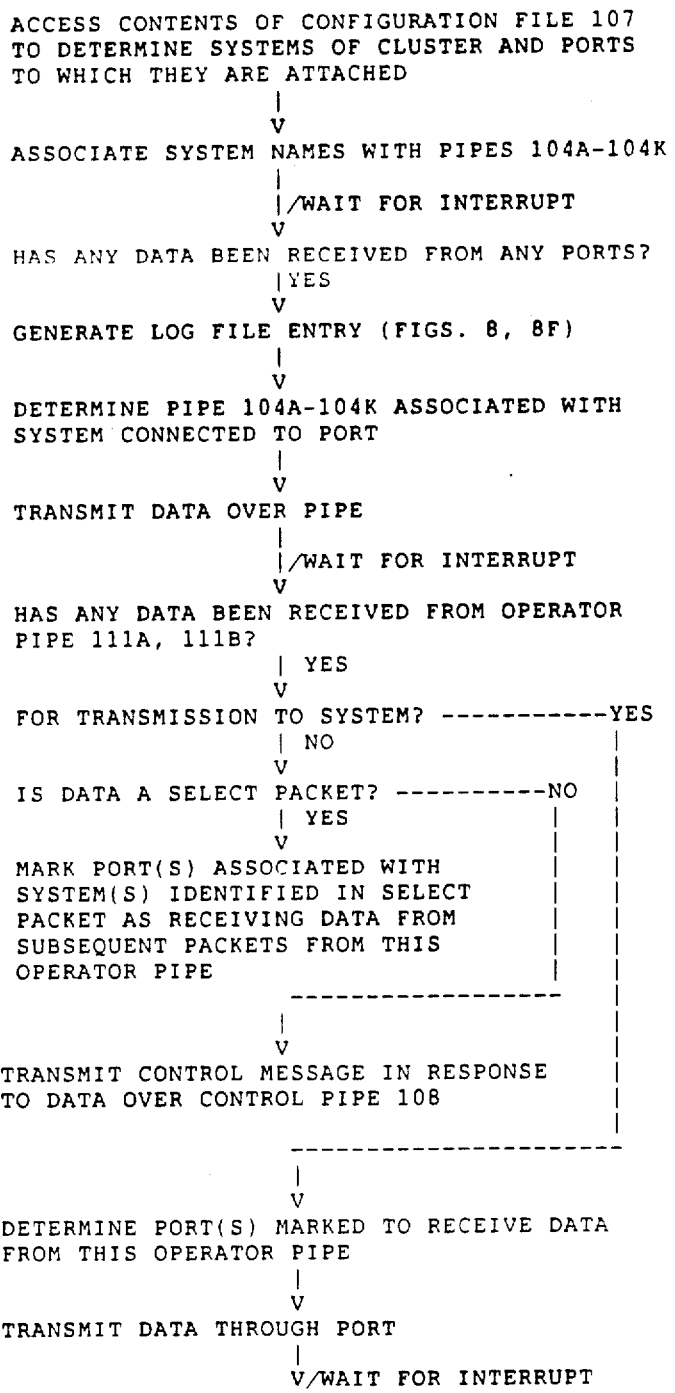

As noted, the input/output data logger 100 begins running at initial power-on of the console 10. As shown in FIG. 10, the interface 103 determines, from the configuration file 107, the console link ports associated with each system and begins making entries in the log file of communication from the systems as described below in connection with FIGS. 8-8F. In addition, the interface 103 couples data from the console link ports to the pipe 104a-104k associated with each system.

In addition, the interface 103 periodically is interrupted by receipt of messages from the operator data(s) 111a, 111b, associated with the operator interfacer 102(a), 102(b) to determine whether an operator has entered any data to be transmitted over console communications links 52a-52n and 53a-53m. Such data is in the form of packets some of which are "select" packets whichinclude system identification information which identifies the system to receive data sent in succeeding system data packets. The interface determines, based on the system identified in the select packets and the contents of the configuration file 107, the port in ports 70 through which it should send the data in the system data packets.

The interface 103 continues to send data through the identified port received from the pipe 111a, 111b, until it receives a select-packet identifying another system. In addition, the interface 103 makes an entry in the log file identifying the length of data sent, as described below in connection with FIGS. 8 and 8E. The data itself is not recorded in the log file entry unless it is echoed by the receiving system 11a-11n or 12a-12m; the echoed data is recorded in an entry in log file 110.

The operations performed by data recorder 101 will be described in connection with FIG. 11. The data recorder 101 receives from the executive program the names of the systems from which it is to record data. The recorder 101 sets up a pointer to iteratively point to each system name. For each system name, the particular buffer 140a-140k associated with the system name is determined, and the contents of the buffer examined to determine if there is any ASCII string data which has not been recorded. If there is, the data recorder enables a printer (FIG. 2) to print the system name of the system associated with the buffer, the data and the time. The recorder repeats this until all of the buffers have been examined which are associated with the systems whose system names were transferred by the executive program. After all of the buffers have been examined, the pointer is reset to point to the first buffer, and the process is repeated.

Figure 12A:
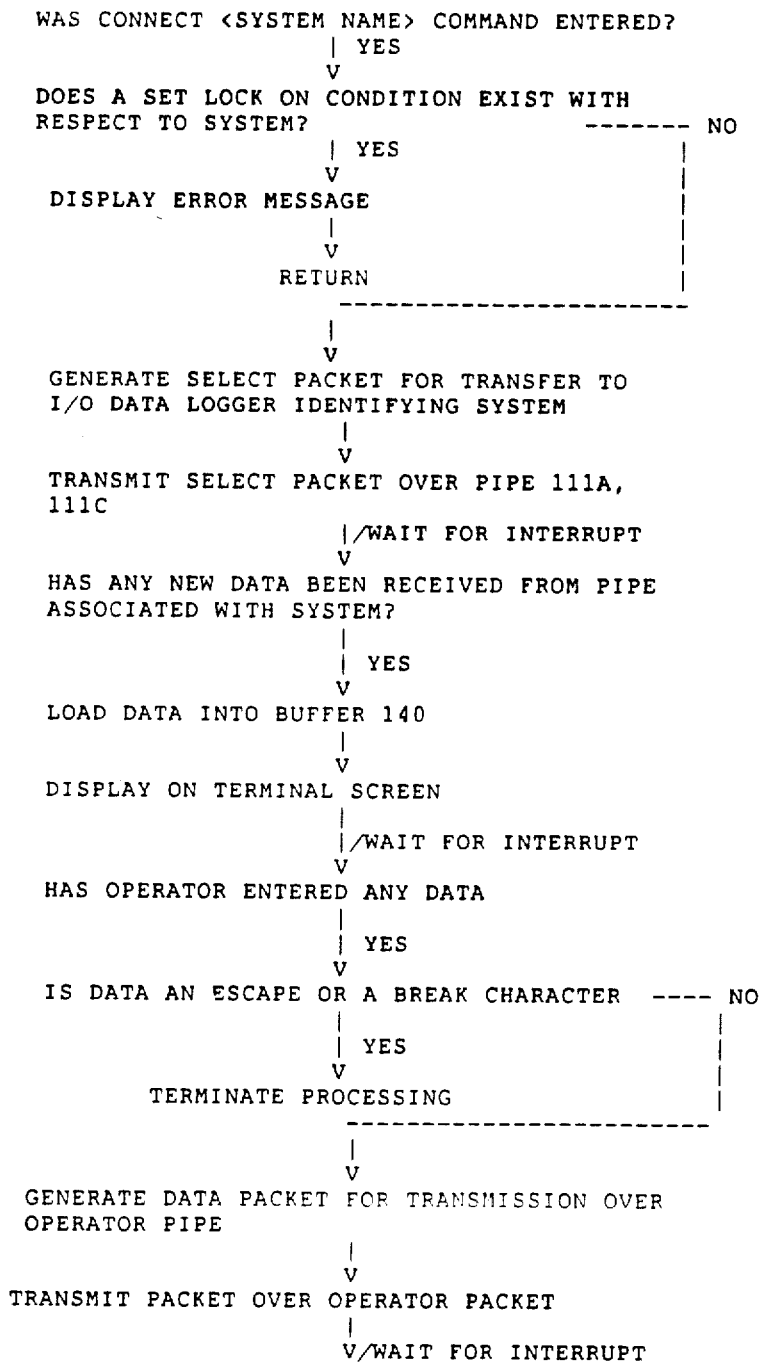

The operations performed by the operater interface 102a, 102b, will be described in connection with FIGS. 12A-12I. With reference to FIG. 12A, the operator interface first determines whether the CONNECT command or the MONITOR command was entered. If the CONNECT command was entered, along with a system name, the operator interface 102a, 102b, at which the command was entered operates in the CONNECT mode, and obtains data for display only from the pipe 104a-104k associated with the system identified by the system name entered with the CONNECT command. The data so obtained is displayed as illustrated in FIG. 4A. In addition, the operator interface sends a slect packet with the system name to interface 103 indicating that future data from the interface is to be coupled to the identified system. When the operator thereafter enters data at the terminal keyboard (not shown), unless the data is an escape character or a break character, or unless a SET LOCK ON condition exists (described below in connection with FIG. 12J) with respect to the system, the interface generates a packet containing the data and couples it to the operator data 111a, 111b associated with the interface. If the data is an escape character, the operator interface terminates processing under the CONNECT command, and returns control to the executive program depicted in FIG. 9. If the character is a break character, the operator interface sends a request for a break sequence on the pipe 111a, 111b. In any case, the data entered by the operator is not then displayed on the screen of the terminal 71a, 71b, but it is displayed if it is echoed by the receiving system.

If the command is a MONITOR command, the operator interface 102a, 102b, at which the command was entered sends a message to the input/output data logger 100 indicating that it is operating in MONITOR mode and identifying the systems 11a-11n and 12a-12m that it is monitoring. The data logger 100 transmits a message over pipe 108, which identifies the operator interface that is in monitor mode and the systems 11a-11n and 12a-12m which it is monitoring. The data scanner 106 receives the message and uses its contents in its operations.

Figure 12B:
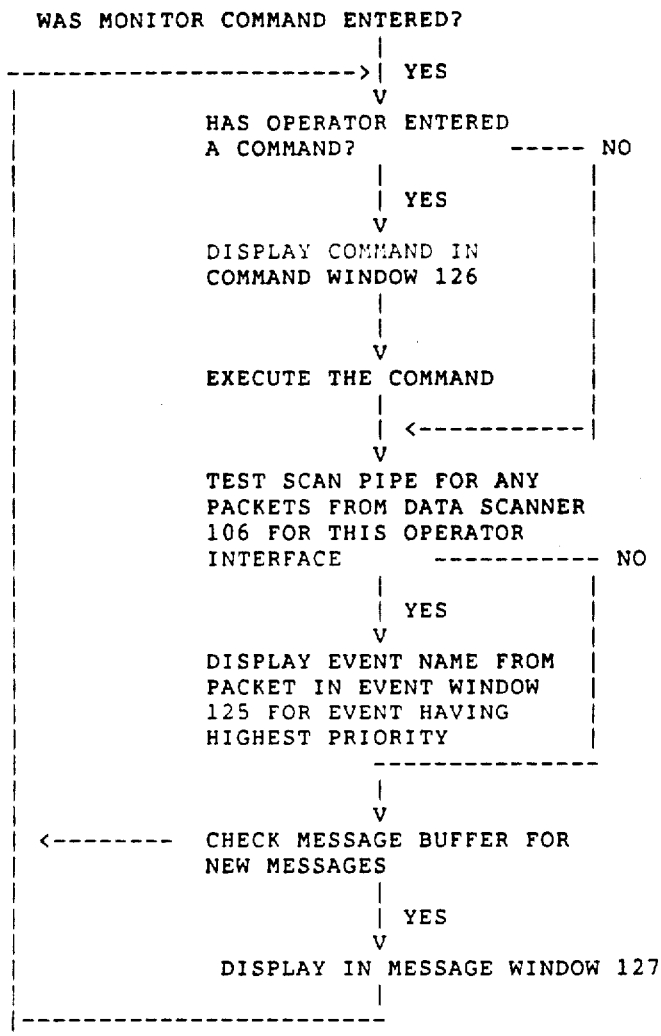

The operator interface maintains the system names in a system name list (not shown) for use in later operations in the MONITOR mode. With reference to FIG. 12B, when the operator interface is operating in MONITOR mode, the operator interface enables the screen of the terminal 71a, 71b to have a configuration as depicted in FIG. 4b, with the exception that only one log area 123 is displayed.

When the operator interface 102a, 102b, initially begins operating in response to a MONITOR command, it monitors the keyboard of the operator's terminal 71a, 71b. If the operator enters data, it is interpreted as a command, and the keystrokes are displayed in the command window 126 (FIG. 4B). The operator interface 102a, 102b, then executes the command. The operations of the operator interface in response to selected illustrative commands will be described below in connection with FIGS. 12C-12J.

The commands which may be entered by an operator while the operator interface is in the MONITOR mode may be generally divided into three groups, namely, (1) a terminal control group, which controls the operation of the terminal, (2) a system monitor group in which the operator can view data from and transmit data to the systems 11a-11n and 12a-12m, and (3) a console control group, in which the operator can control certain operations of the modules comprising console 10.

Figure 12C:
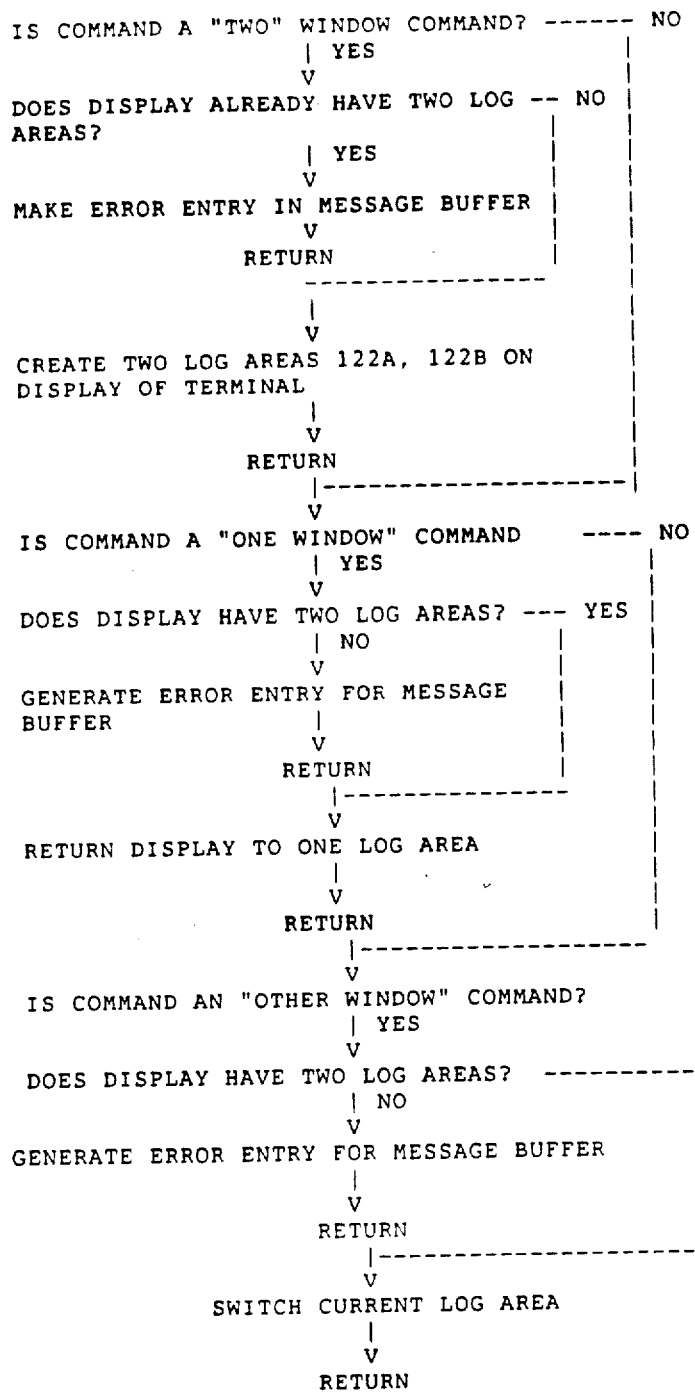
Figure 12:
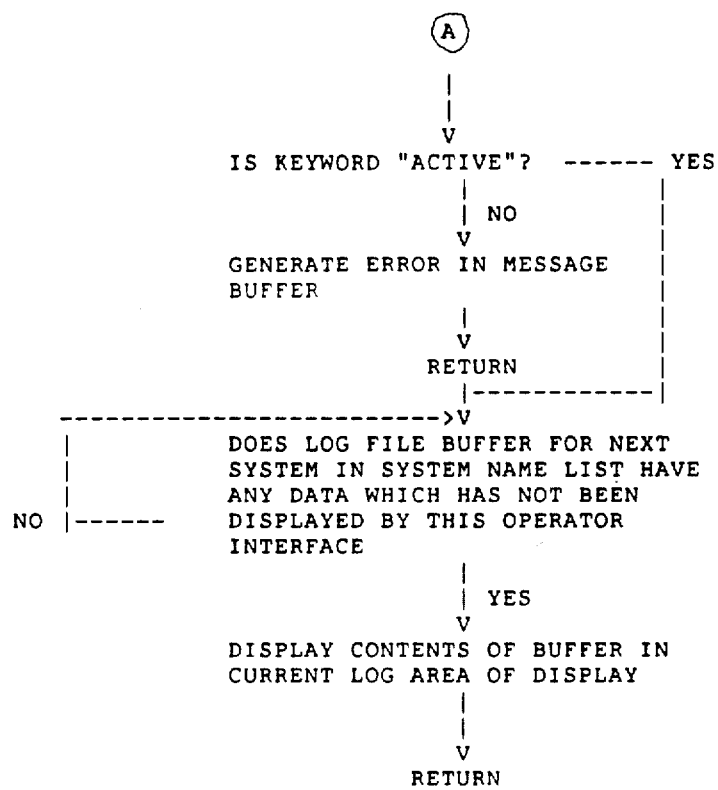

With reference to FIGS. 12C-12F, several commands from the terminal control group will be described. The commands depicted in FIG. 12C are used to adjust the number of log areas 122A and 122B (FIG. 4B), that is, the number of windows that are available for log data from the systems 11a-11n and 12a-12m being monitored by the console. As shown in FIG. 12C, when the operator enters a TWO WINDOW command, and if the operator interface 102a, 102b which received the command was only providing one log area 122, it then provides two log areas 122A and 122B as shown in FIG. 4B. If the operator interface was already providing two log areas when the command was entered, an error is noted in the message buffer 143 and the command is ignored. When an operator enters a ONE WINDOW command, if the operator interface is providing two log areas, it thereafter provides only one log area. If, on the other hand, the operator interface receives a ONE WINDOW command while it was providing only one log area, an error is noted in the message buffer 144 and the command is ignored.

Also illustrated in FIG. 12C is an OTHER WINDOW command which allows an operator to switch between two log areas 122a, 122b.

With reference to FIG. 12D, a VIEW command permits the operator to view the contents of various buffers in console 10. Along with the VIEW command word, the operator enters a keyword which identifies the buffer whose contents are to be displayed. If the keyword is MESSAGE, the contents of the message buffer 143 (FIG. 7) are displayed. If the keyword is HELP, selected contents of help buffer 144 (FIG. 7) are displayed. If the keyword is a system name, NEXT, or ACTIVE, the contents of various buffers (not shown) in input/output data logger 100, and specifically log file 110, are displayed. These buffers store data from systems 11a-11n and 12a-12m until it is written to disks 64a-64c (FIG. 2). If the keyword is NEXT while the operator is viewing the contents of a buffer associated with one system, the operator interface 102a, 102b displays the contents of the log file buffer associated with the next system in the list of system names that was entered along with the MONITOR command. If the keyword is ACTIVE, the operations of the operator interface are similar to its operations in response to the NEXT keyword, except that it skips buffers which do not have system data which has not been displayed; that is, the operator interface displays the contents of the next buffer which has data that has not been previously displayed.

Two other commands, depicted in FIG. 12E, permit the operator to cause the interface 103 to stop service, that is, to stop receiving data from selected systems 11a-11n and 12a-12m (FIG. 1) and to restore service to those systems. With reference to FIG. 12E, if the operator enters a DISABLE command with a system name, the interface 103 marks it as being disabled and stops receiving data from the port to which the system is connected. In addition, the interface, on receiving the disable command, transmits a message over pipe 108 to the data recorder 101, operator interfaces 102a, 102b, and data scanner 106 that service to the system has been terminated. If an operator attempts to transmit data to the system, the operator interface for the terminal will display an error message in the message window 127. An operator can restore service to the system by the ENABLE command. The operator interface 102a, 102b first checks to determine whether the system had been previously marked in response to the DISABLE command, and, if not, generates an error message for message window 127 and ignores the command. If the system was marked as being disabled, the interface unmarks it and transmits a message over pipe 108 that service has been restored to the system.

Figure 12F:
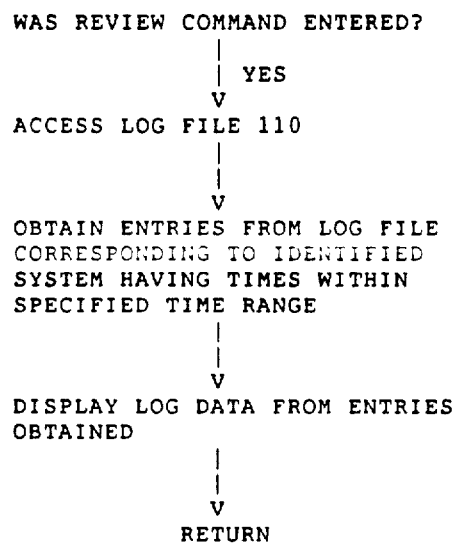
Figure 12G:
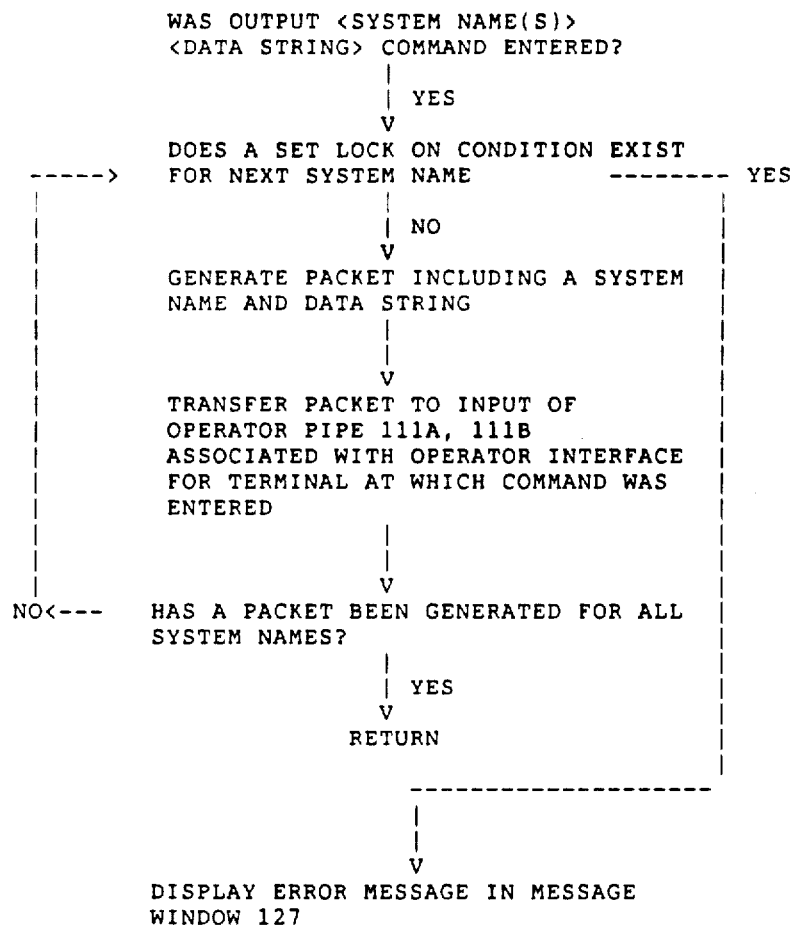

In addition, the operator may review the contents of the log file 110 for entries relating to a particular system by means of a REVIEW command, as depicted in FIG. 12F. The operator enters a system name and time range, and the operator interface 102a, 102b, accesses the log file 110 and retrieves the contents for the specified system and time range.

The operator may transmit data in the form of ASCII data strings to selected ones of the systems 11a-11n and 12a-12m by use of three commands, namely the OUTPUT, SELECT and CONNECT commands. The processing in response to the CONNECT command here is the same as under the executive program (see FIG. 12A), except that when the operator enters the escape character, the operator interface returns to the MONITOR mode.

With reference to the OUTPUT command (FIG. 12G), along with that command the operator enters one or more system names and an ASCII data string, the data string to be sent to the systems 11a-11n and 12a-12m corresponding to the entered system names. The command, system names and data string are displayed by the operator interface 102a, 102b in the command window 126 of the screen 121 of the terminal 71a, 71b at which the command was entered. In response to the entry of the command, the operator interface iteratively determines if a SET LOCK ON condition exists for each system name, and if not it generates a select packet identifying the systems and a data packet containing the data string. The operator interface couples each generated packet to the input of the corresponding operator data 111A, 111B. The interface 103 (FIG. 3) later receives each packet and transmits the data string through the appropriate one of ports 70 to the identified system 11a-11n and 12a-12m. In addition, the input/output data logger 100 makes an appropriate entry in log file 110. If a SET LOCK ON condition was determined to exist for a system, an error entry is made in the log file and a message is displayed in the message window. In that case, the select packet does not identify the system for which the SET LOCK ON condition exists.

If the operator enters a SELECT command (FIG. 12H) with one system name, the operator interface displays the contents of the buffer 140a-140k associated with that system in a log area 122A, 122B (FIG. 4B) of the operator's terminal 71a, 71b (FIG. 2). In addition, for each data string entered by the operator at the keyboard, unless the data string is an escape character, unless a SET LOCK ON condition exists for that system the operator interface generates a control packet identifying the system and containing the data string and couples the packet to the input of the operator data 111a, 111b. The input/output data logger 100 processes the packet in the same way as described above in connection with the OUTPUT command. The operator interface 102a, 102b, does not display the data string in the log area 122A, 122B as it is entered by the operator, it instead displays the string as it is echoed by the receiving system.

If the operator enters the escape character, the operator interface terminates processing of the SELECT command. If a SET LOCK ON condition exists, in response to the operator entering any data string other than the escape character, the operator interface generates an error entry for storage in the log file 110 and displays a message in message window 127.

Figure 12I:
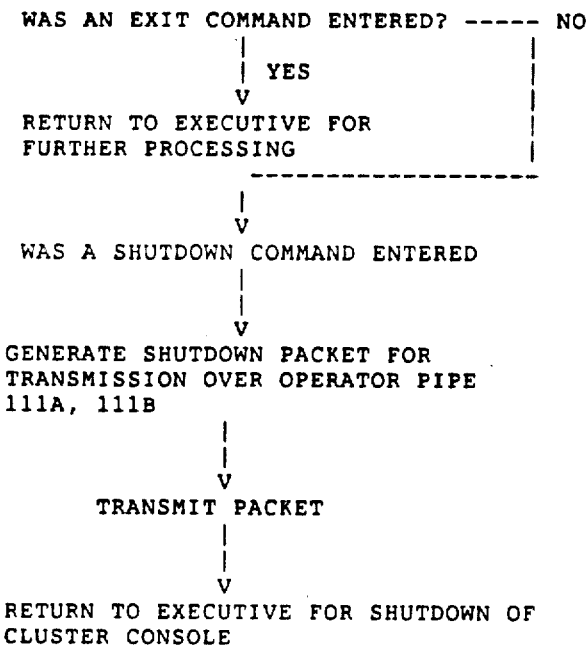

Two console control commands are depicted in FIG. 12I, namely an EXIT command and a SHUTDOWN command. The EXIT command returns processing to the executive program, and in response to SHUTDOWN command, the processor 60 (FIG. 2) stops processing all the cluster console program including the input/output data logger 100 and data scanner 106.

Figure 12J:
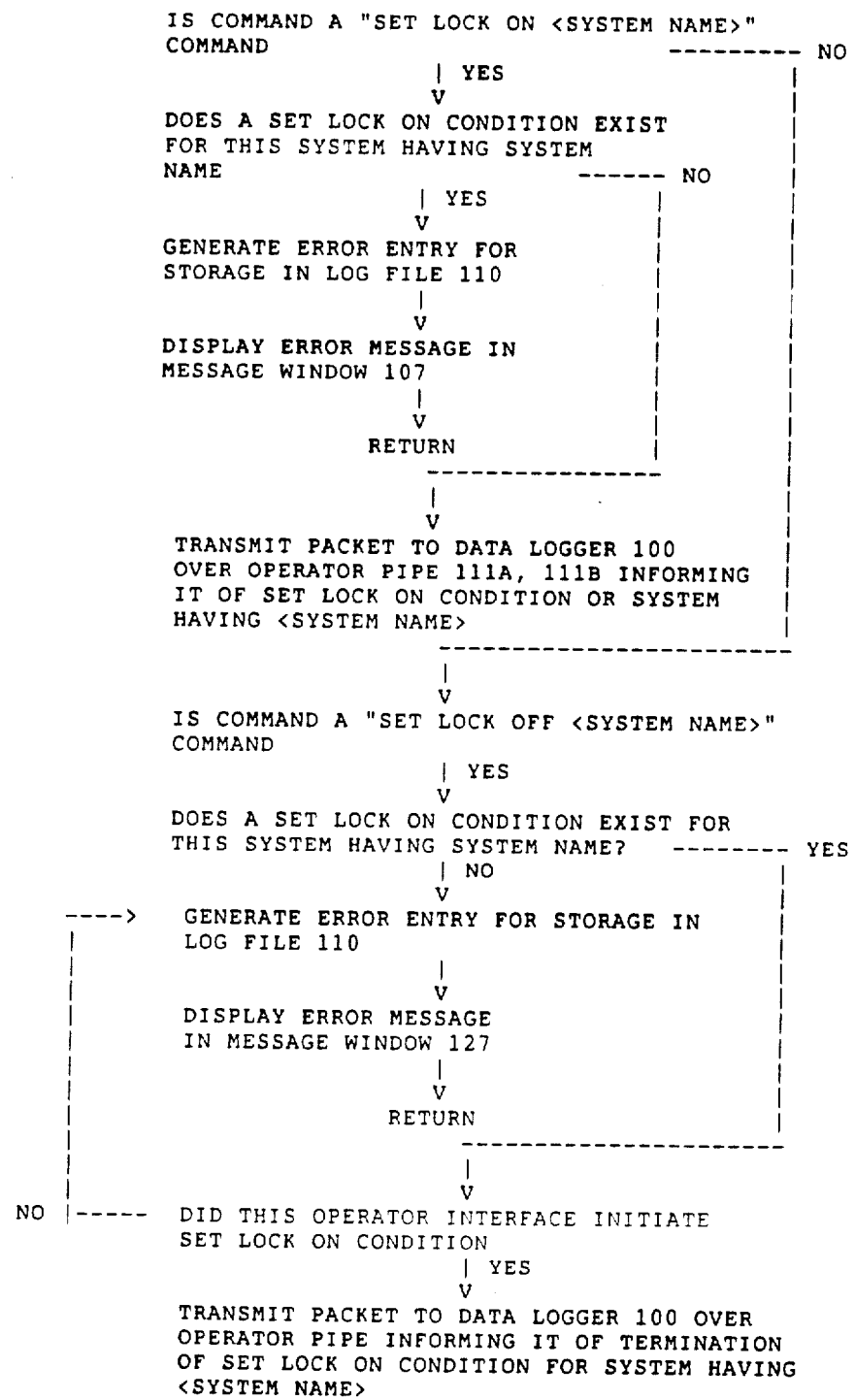

With reference to FIG. 12J, SET LOCK ON command, which an operator enters with a system name, allows an operator at one terminal 71a, 71b (FIG. 2) to prevent operators at other terminals from transmitting data to the system 11a-11n or 12a-12m having the associated system name. When a SET LOCK ON command is entered at an operator interface 102a, 102b, a SET LOCK ON condition exists in the other operator interfaces.

In response to entry of a SET LOCK ON command, the operator interface first determines if a SET LOCK ON condition already exists which has been initiated by another operator interface. If such a condition already exists, an error message is displayed in the message window 127. If the condition does not currently exist, the operator interface transmits a message to the I/O data logger 100, which in turn generates a message for transmission over pipe 108 of the SET LOCK ON condition. The other operator interfacer receives the message and notes the existence of the condition. If an operator attempts to transmit data to a system for which a SET LOCK ON condition exists, the operator interface does not generate the select packet but instead displays an error message in message window 127.

The SET LOCK ON condition is terminated for a system by entry of the SET LOCK OFF command at the terminal 71a, 71b, at which the SET LOCK ON command was previously entered. In response to the SET LOCK OFF command, if the terminal did not originate the SET LOCK ON condition, an error message is displayed in message window 127. If the terminal did originate the condition, the operator interface transmits a message over associated pipe 111a, 111b, of the removal of the SET LOCK ON condition. In response, input/output data logger 100 transmits a message over pipe 108 notifying other operator interfaces of the removal of the condition.

In addition, an operator may enter a SET LOCK AUTOMATIC command (not shown). In response, the operator interface transmits a message to the input/output data logger 100 notifying it of the command over pipe 111a, 111b. When the opeator interface 102a, 102b thereafter receives a SELECT command from an operator, the data logger 100 then transmits a message to the other operator interfacers over pipe 108 that the SET LOCK ON condition exists, and, in response to the escape character terminating the SELECT operation, sends a message to them that the SET LOCK ON condition has been terminated. Thus, the operating SET LOCK ON condition exists only while the operator interface is operating under the SELECT command.

Figure 12K:
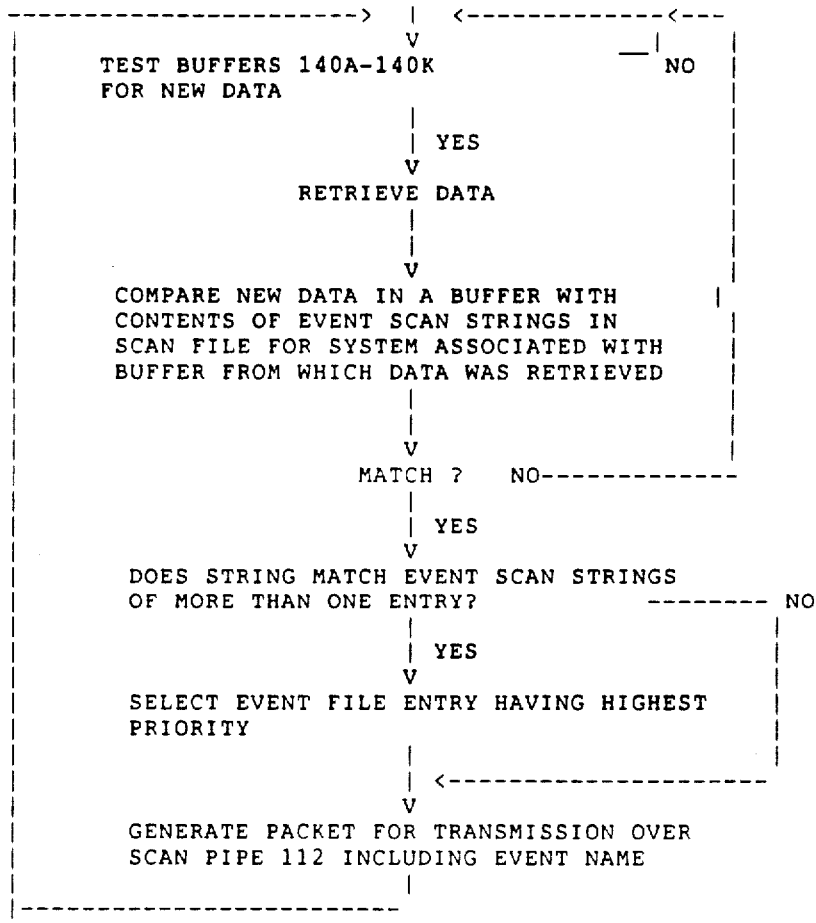

The operations performed by data scanner 101 are depicted in FIG. 12K. As shown in FIG. 12K the data scanner first uses the system names that are entered with the MONITOR command which it receives from input output data logger 100 over pipe 108 to identify from the configuration file 107 the scan files for the indicated systems. Specifically, the data logger 100 transmits to the data scanner over pipe 108 the contents of the SCAN FILE ID fields of the entries in the configuration file associated with systems whose system names were entered with the MONITOR command. After that, the data scanner 106 monitors the pipes 104a-104k for each of the named systems and compares the data received to the entries in the contents of the scan file identified for that system as specified by the SCAN FILE ID field of the configuration file 107. If there is a partial or complete match, the data scanner 106 generates a packet for transfer over the scan pipe 112. The packet includes the identification of the operator interface 102A, 102B, monitoring the system and the contents of the EVENT NAME field associated with the SCAN EVENT STRING.

With reference again to FIG. 12B, each operator interfaces 102A, 102B, while processing the MONITOR command, periodically checks the scan pipe 112 and displays in the event window 125 (FIG. 4B) the data, that is, the EVENT NAME from packets directed to it.

If the data scanner 106 detects several data strings in buffers 140a-140k which match the contents of EVENT SCAN STRING fields, it generates packets in the order specified in the contents of the event priority level.

(f) Log File Entries

Figure 8:
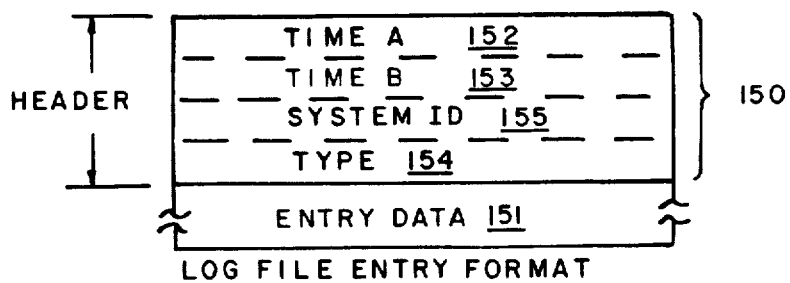

As has been mentioned above, the log file 110 stores data supplied to it by interface module 103. The log file stores data in the form of entries all of whose general structures have the form depicted in FIG. 8. With reference to FIG. 8, each entry stored in the log file 110 includes a header 150 and an entry data field 151. The header includes a TIME A field 152 and a TIME B field 153, the contents of which depend on the nature of the entry which is indicated by the contents of a TYPE field 154. In addition, the header 150 includes a SYSTEM ID field 155. Depending on the type of entry, the contents of the SYSTEM ID field may identify the particular system 11a-11n and 12a-12m or the cluster console itself as causing the generation of the entry.

Figure 8A:
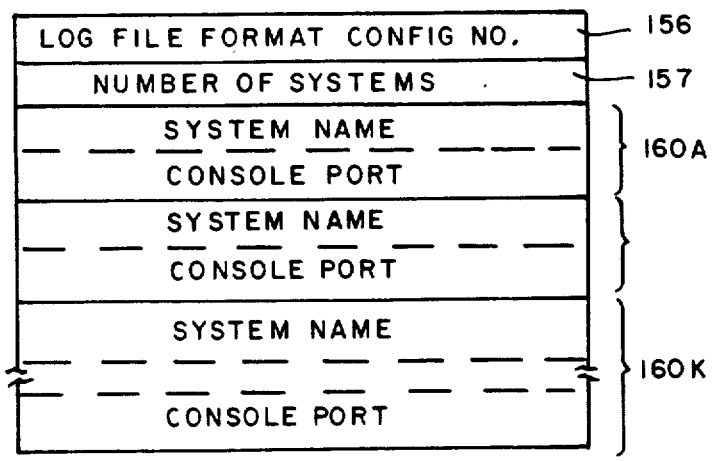

FIGS. 8A through 8F depict the formats of the entry data portion 151 of six different types of log file entries. Each type is identified by the contents of the TYPE field 154 in header 150 (FIG. 8). FIG. 8A depicts the format of the data in a CONFIGURATION entry that is entered into the log file 110 when the cluster console 10 begins operation and when any change made to the contents of the configuration file 107 is detected through a reconfiguration. In a CONFIGURATION entry, the contents of the TIME A field 152, (FIG. 8) identify the time at which the cluster console begins operation on the configuration was changed. The contents of the SYSTEM ID field 155 identify the cluster console 10 as the originating unit and the TYPE field 154 identify the entry as a CONFIGURATION entry.

In the entry data area 151 of a CONFIGURATION entry, the contents of a CONFIGURATION number field 156 contain an identifying value. A plurality of fields 160a-160k identify the correspondence between system names and the ones of serial ports 70 (FIG. 2) to which the identified system is attached. Finally, the contents of a field 157 indicate the number of fields 160A-160K. If the entry is in response to the cluster console 10 beginning operation, the number of fields 160a-160k corresponds to the number of systems 11a-11n and 12a-12m in the cluster. If the entry is in response to a change in the configuration file 107, the number of fields 160a-160k reflects the new number of systems.

Figure 8B:
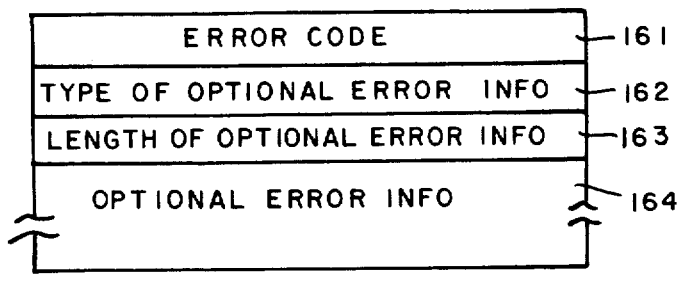

If an error occurs within the cluster console 10 itself, an error entry is placed in the log file 110. With reference to FIGS. 8 and 8B, an error entry contains, in the TIME A field 152, the time the error occurred. The contents of the SYSTEM ID field 155 identifies the cluster console as the device originating the entry. The contents of the TYPE field 154 identifies the entry as being an error entry. The TIME B field is empty.

The entry data area 151 for an error entry is depicted in FIG. 8B and includes an ERROR CODE field 161 whose contents identify the error, an ERROR TYPE field 162 and a LENGTH field 163, both of whose contents relate to an area 164 in which optional error information can be inserted. The type field 162 identifies the form of the optional error information, that is, whether it is in the form of ASCII characters, in binary form and the like. The optional error information which may be included in area 164 may provide context for the error whose type is identified in ERROR TYPE field 161.

Figure 8C:

With reference to FIGS. 8 and 8C, an entry is made into log file 110 whenever an operator ends or begins service of the systems 11a-11n and 12a-12m in response to a DISABLE command or an ENABLE command. This type of entry identifies the systems 11a-11n and 12a-12m and when any changes occurred to the service to the systems. An entry is placed in the log file 110 having the format depicted in FIGS. 8 and 8C. The contents of the SYSTEM ID field identify the system for which monitoring began or ended; that is, the field contains the system name as entered by the operator with the command. The contents of the TIME A field 152 (FIG. 8) identify the time that the cluster console started or stopped monitoring a system. If the contents of the TIME B field are zero, the contents of the TIME A field identify the time at which monitoring of the system began. If the contents of the TIME B field are non-zero, the contents of the TIME A field identify the time at which monitoring of the system ended, and the contents of the TIME B field identify the time at which monitoring of the system began. The contents of the TIME B field 153 identify the time at which it resumed monitoring the system. The contents of the TYPE field 154 indicates that the entry is a service initiation or termination entry.

With reference to FIG. 8C, the entry data 151 (FIG. 8) includes an operator name field 165 whose contents identify the operator which entered the command which caused generation of the entry, and a field 166 identifying the console terminal 71a, 71b associated with the command.

Figure 8D:
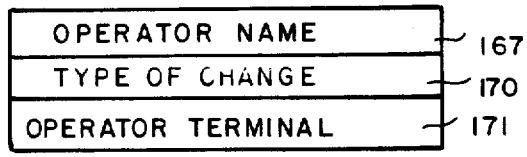

With reference to FIGS. 8 and 8D, an operator status change entry is entered into the log file 110 when an operator begins or ends operating the terminal 71a, 71b (FIG. 2) of the console 10 or in response to certain other commands, namely a SET LOCK ON or SET LOCK OFF commands. The contents of the TIME A field 152 identify the time of the entry, that is, the time the operator began or ended operation of the terminal or enter the SET LOCK ON or SET LOCK OFF commands. The contents of the TIME B field 153 contains a zero if the entry is in response to commencement of operation or is in response to a SET LOCK ON command; if the entry is in response to operation termination or a SET LOCK OFF command, the TIME B field 153 contains the time the operator commenced operation or issued the SET LOCK ON command. The contents of the SYSTEM ID field 155 identify the console terminal 71a, 71b (FIG. 2) if the entry is in response to commencement or termination of operation of the terminal, or alternatively the system 11a-11n or 12a-12m for which the SET LOCK ON or SET LOCK OFF command was entered. The contents of the TYPE field 154 identify the entry as a status change entry.

With reference to FIG. 8D, the entry data area 151 of the status change entry includes a field 167 whose contents identify the operator operating the terminal that initiated generation of the entry and a field 170 whose contents identifies the nature of the status change, namely whether the entry is in response to commencement or termination of operation of the terminal or in response to a SET LOCK ON or SET LOCK OFF command. Finally, a status change entry includes an operator terminal field 171 whose contents identifies the terminal 71a or 71b at which the operator was working.

Figure 8E:
Figure 8F:
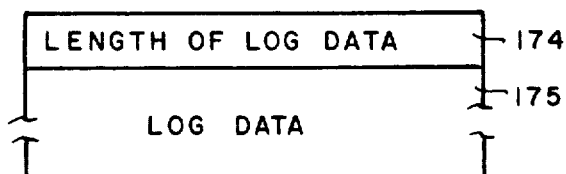

None of the operations log file entries described above relate to data transmitted between the cluster console 10 and the systems 11a-11n and 12a-12m. The log file entries depicted with reference to FIGS. 8, 8E and 8F relate to such data. FIG. 8E depicts contents of the entry data area 151 (FIG. 8) relating to data transmitted by the cluster console to a system 11a-11n and 12a-12m over console communication links 52a-52n and 53a-53m. FIG. 8F depicts the contents of the entry data area 151 for entries relating to data which the cluster console received from the systems 11a-11n and 12a-12m.

With reference to FIGS. 8 and 8E, when an operator enters data at terminal 71a-71b to be transmitted to a system 11a-11n and 12a-12m, an entry is made in the log file 110 including a TIME A field 152 and a TIME B field 153 which contain the beginning and ending times of the data transmission, a SYSTEM ID field 155 whose contents identify the system 11a-11n or 12a-12m to which the data is transmitted and a TYPE field 154 whose contents identify the entry as being in response to transmission of data from the cluster console 10 to a system. The contents of entry data area 151 is depicted in FIG. 8E and includes an OPERATOR NAME field 172 which contains the name of the operator at the terminal 71a, 71b, which originated the data sent to the system and a field 173 which contains the length of the output data. The data itself is not stored in the log file entry; however, if the system echoes the data, as is typical with respect to all such data except for operator passwords, an entry is made as described below in connection with FIGS. 8 and 8F in the log file 110 for the echoed data as with any other data from a system 11a-11n and 12a-12m.

With reference to FIGS. 8 and 8F, a log file entry for data received from a system 11a-11n or 12a-12m includes TIME A and TIME B fields 152 and 153 which identify the beginning and end times for the reception of the data, a SYSTEM ID field 155 whose contents identify the system from which the data was received and a TYPE field 154 whose contents identify the entry as containing data from a system 11a-11n and 12a-12m. With reference to FIG. 8F, the entry data area 151 (FIG. 8) includes a field 174 whose contents identify the length of the received data, that is, the number of characters which have been received, and a log data area 175 which contains the actual data received from the system 11a 11n or 12a-12m. In one specific embodiment, the cluster console 10 determines the end of a data stream from a system 11a-11n or 12a-12m by means of a selected control character, specifically an ASCII carriage return character; however, if the system stops transmitting data for a selected period of time, the cluster console stores the data in an entry even though it has not received the control character.

The foregoing description is limited to a specific embodiment of this invention. It will be apparent, however, that this invention can be practiced in systems having diverse basic construction than is described in the specification with some or all of the foregoing advantages. Therefore, it is the object of the appended claims to cover all such variations and modifications which come within the true spirit and scope of this invention.

What is claimed as new and desired to be secured by Letters Patent of the United States is:

1. A cluster console used by an operator to control a plurality of digital system means each having a console port for transmitting system data to said console and for receiving control data from said console, said cluster console comprising input/output means, operator interface means and communications pipe means for coupling data between said input/output means and said operator interface means;
   A. said pipe means comprising a plurality of system communications pipe means each associated with one of said digital system means and an operator communications pipe means associated with said operator interface means;
   B. said input/output means including:
      i. a plurality of port means each for connection to a console port of said digital system means for receiving system data from said and selectively transmitting control data to said digital system means, and
      ii. data coupling means connected to all of said port menas for coupling the data from each said port means to the system communications pipe means associated with the digital system means from which the data was received; and
      iii. operator data coupling means connected to said operator communications pipe means and all of said port means for receiving data from said operator communications pipe means, determining the digital system means to receive the data and coupling the data to the port means associated with that digital system means; and
   C. operator interface means connected to said system communications pipe means and said operator communications pipes and including means for selectively displaying data received from said communication pipe means, said operator interface means further including means for receiving data entered by an operator for transmission to a digital system means and for coupling data to the operator communications pipe means with an identification of the digital system means to receive the data.

2. A cluster console as defined in claim 1 wherein said system data is in the form of data strings and said input/output means further includes log file means connected to all of said port means and including a plurality of entries each for storing each system data string received by said port means from a digital system and the identification of the digital system from which each system data string was received.

3. A cluster console as defined in claim 1 wherein said input/output means further comprises configuration file means containing a plurality of entries each identifying a digital system and a port means, said data coupling means including means for using the entries of said configuration file means to identify the digital system from which data through each port is received the system communications pipe means to thereby receive the data.

4. A cluster console as defined in claim 1 further comprising a scan pipe means and a data scan means including a plurality of data storage means each storing preselected items of data and comparison means connected to said system communications means and said data storage means for detecting when data from said system communications pipe means matches data stored in said data storage means, said data scan means further comprising message transmitting means connected to said scan pipe means and said comparison means for transmitting a message indicating a match, said operator interface means further comprising means connected to said scan pipe means for receiving messages and for displaying them for an operator.

5. A cluster console as defined in claim 1 further comprising recorder means connected to said system communications pipe means for printing data transmitted over selected ones of said system communications pipe means.

6. A cluster console as defined in claim 1 further comprising a second operator interface means connected to said system communications pipe means and a second operator communications pipe means connected to said second operator interface means and said input/output means, said second operator interface means including means for selectively displaying data received from said communications pipe means, means for receiving data entered by an operator for transmission to a digital system means and for coupling the data to the second operator communications pipe means with an identification of the digital system means to receive the date, said first operator interfaces means including means responsive to selected data from an operator for establishing a lock conditions in the second operator interface means to thereby inhibit the second operator interface means from coupling data to its connected control communications pipe means with an identification of selected digital system means and responsive to selected other data from an operator for terminating a lock condition.

7. A digital data processing system including cluster console used by an operator to control a plurality of digital system means each having a console port for transmitting system data to said console and for receiving control data from said console, said cluster console comprising input/output means, operator interface means and communications pipe means for coupling data between said input/output means and said operator interface means;
   A. said pipe means comprising a plurality of system communications pipe means associated with one of said digital system means and an operator communications pipe means associated with said operator interface means;
   B. said input/output means including
      i. a plurality of port means connected to a console port of a digital system means for receiving system data from and selectively transmitting control data to said digital system means; and
      ii. data coupling means connected to all of said port means for coupling the data from each said port means to the system communication pipe means associated with the digital system from which the data was received; and
      iii. control data coupling means connected to said operator communications pipe means and all of said port means for receiving control data from operator communications pipe means, determining the digital system means to receive the data and coupling the data to the port means associated with that digital system means; and C. operator interface means connected to said system communications pipe means and including means for selectively displaying data received from said communications pipe means, said operator interface means further including means for receiving data entered by an operator for transmission to a digital system means and for coupling the data to the operator communications pipe means with an identification of the digital system to means to receive the data.

8. A data processing system as defined in claim 7 wherein said system data is in the form of data strings and said input/output means further includes log file means connected to all of said port means and including a plurality of entries each for storing each system data string received by said port means from a digital system and the identification of the digital system from which each system data string was received.

9. A data processing system as defined in claim 7 wherein said input/output means further comprises configuration file means containing a plurality of entries each identifying a digital system and a port means, said data coupling means including means for using the contents of said configuration file means to identify the digital system from which data through each port is received, to thereby identify the system communications pipe means to receive the data.

10. A data processing system as defined in claim 7 further comprising a scan pipe means and a data scan means including a plurality of data storage means each storing preselected items of data and comparison means connected to said system communications means and said data storage means for detecting when data from said system communications pipe means matches data stored in a data storage means, said data scan means further comprising message transmitting means connected to said scan pipe means and said comparison means for transmitting a message indicating a match, said operator interface means further comprising means connected to said scan pipe means for receiving messages and for displaying them for an operator.

11. A data processing system defined in claim 7 further comprising recorder means connected to said system communications pipe means for printing data transmitted over selected ones of said system communications pipe means.

12. A data processing system defined in claim 7 further comprising a second operator interface means connected to said system communications pipe means and a second operator communications pipe means connected to said second operator interface means and said input/output means, said second operator interface means including means for selectively displaying data received from said communications pipe means, means for receiving data entered by an operator for transmission to a digital system means and for coupling the data to the second control communications pipe means with an identification of the digital system means to receive the data said first operator interface means including means responsive to selected data from an operator for establishing a lock condition in the second operator interface means to thereby inhibit the second operator interfacer means from coupling data to its connected operator communications pipe means with an identification of selected digital system means and responsive to selected other data from an operator for terminating a lock condition.

* * * * *